Patented Oct. 31, 1944

2,361,500

UNITED STATES PATENT OFFICE 2,361,500

ESTERS OF CELLULOSE

Robert D. Rowley, Narrows, Va., assignor to Celanese Corporation of America, a corporation of Delaware No Drawing. Application October 29, 1942, Serial No. 463,779

6 Claims. (Cl. 260—230)

This invention relates to improvements in the production of organic esters of cellulose, and relates more particularly to the production of cellulose acetate or other cellulose esters, particularly the lower fatty acid esters of cellulose.

An object of this invention is the production of organic esters of cellulose of improved stability.

Another object of this invention is the provision of a novel process for the production of improved organic esters of cellulose wherein organic acids are employed for the ripening thereof.

Other objects of this invention will appear from the following detailed description.

In the process of preparing organic esters of cellulose, the esterification of cellulose is usually carried out by treating cellulose with an organic acid anhydride in the presence of a catalyst such as sulfuric acid and an organic acid diluent or solvent for the ester of cellulose being formed. The esterified cellulose is obtained in the form of viscous, homogeneous solution in the organic acid to which water is added in amounts sufficient to convert any organic acid anhydride remaining into the corresponding acid. The cellulose ester, usually after the addition of a further quantity of water, is permitted to hydrolyze or ripen to develop the desired solubility characteristics. Water and/or other non-solvent for the cellulose ester is then added in sufficient amounts to precipitate the cellulose ester from solution. The precipitated cellulose ester is finally washed with water to free it of acid.

In the preparation of cellulose acetate in accordance with the above process, the cellulose, with or without a pretreatment with organic acids or organic acids containing some sulfuric acid, is acetylated by treatment with acetic anhydride and a catalyst, such as sulfuric acid, in the presence of glacial acetic acid as a solvent for the cellulose acetate formed. The sulfuric acid catalyst is normally present in amounts of from 9 to 15%, or even 20%, on the weight of the cellulose. Part of this sulfuric acid may be introduced in the pretreatment which is designed to make the cellulose more reactive. When the acetylation is completed, water is stirred into the reaction mixture to convert the excess acetic anhydride to acetic acid, and, after the addition of a further amount of water, the resulting solution of cellulose acetate in acetic acid is permitted to stand until the desired solubility characteristics are reached. During this standing or ripening period, not only are acetyl groups split off, but in addition combined sulfuric acid is split off. When the desired solubility characteristics are reached, further ripening is halted and the mixture is treated with a large excess of water or other non-solvent to precipitate the cellulose acetate. The precipitated cellulose acetate is washed with water to remove as much acid or other non-cellulose ester materials as possible and is then subjected to a stabilizing treatment, usually by heating it in suspension in very dilute sulfuric acid, with the object of still further reducing its content of combined sulfuric acid. The sulfuric acid impairs the stability of the cellulose acetate and imparts thereto a tendency to decompose, degrade and/or discolor. The degree of stability is measured by the degree of acidity developed when a sample of cellulose acetate is treated with distilled water under conditions of elevated temperature and pressure for a predetermined period of time. The development of excessive acidity denotes a product of unsatisfactory stability.

During the preparation of cellulose acetate by the above method, the acetylation may take from 1½ to 7 hours and the ripening up to 45 or 50 hours, while the stabilizing treatment may take from 3 to 6 hours to achieve the desired stability in the product. Not only does this process consume an excessive amount of time due to the necessary stabilization treatment, but the necessity for a stabilization treatment limits productive capacity. In addition, the stabilization treatment consumes substantial amounts of sulfuric acid and thus adds to the cost of production.

I have now discovered that cellulose acetate, as well as other organic esters of cellulose, of excellent stability characteristics may be prepared without requiring any stabilization treatment. These highly stable products may be obtained if, after an esterification reaction, as described, the organic ester of cellulose is ripened in two stages. In the first stage the product formed in the esterification of the cellulose is partly ripened in solution in the esterification mixture, after which it is precipitated from said solution, and in the second stage, the cellulose acetate is redissolved and ripened to the desired solubility characteristics in the presence of a ripening agent comprising an aliphatic polycarboxylic acid.

The aliphatic polycarboxylic acids which may be employed in accordance with our invention for ripening the cellulose acetate or other organic ester of cellulose may contain two, three or more carboxyl groups in the structure thereof. Unsaturated polycarboxylic acids, as well as polycarboxylic acids containing substituents such as hydroxy groups, halogen atoms, and the like, may likewise be employed. Examples of suitable polycarboxylic acids which may be employed in accordance with our process are oxalic acid, malonic acid, succinic acid, dibromo-succinic acid, glutaric acid, maleic acid, fumaric acid, malic acid, tartaric acid, aconitic acid, tricarballylic acid and camphoronic acid. The amount of polycarboxylic aliphatic acid which may be employed when ripening the cellulose ester may vary and may be from 0.1 to 5.0% on the weight of the cellulose originally esterified.

While my invention will be more particularly described in connection with the preparation of highly stable cellulose acetate, it will be understood, of course, that other organic esters of cellulose may be prepared in like manner in accordance with my process by employing the proper esterifying agent or agents. Examples of other cellulose esters which may be prepared are, for example, cellulose propionate, cellulose butyrate, and mixed esters such as cellulose acetate-proponiate and cellulose acetate-butyrate.

In carrying out my novel ripening process the cellulose is acetylated in the usual manner, as heretofore described, and, when the esterification is completed, the excess acetic anhydride is destroyed by the addition of water. The cellulose acetate which has been formed is allowed to ripen in solution in the presence of the sulfuric acid employed as the catalyst. Ripening may be carried out during this first ripening stage at temperatures of from 22 to 90° C. for from 2 to 120 hours, preferably until the cellulose acetate reaches an acetyl value of from 56.0 to 58.5%, calculated as acetic acid. If desired, the first ripening stage may be carried out in the presence of a reduced amount of sulfuric acid. The quantity of sulfuric acid present may be reduced by the addition of a suitable neutralizing agent to the solution. Examples of neutralizing agents which may be employed are, for example, magnesium acetate, calcium acetate, magnesium carbonate or calcium carbonate. After the cellulose acetate has ripened as desired, it is precipitated by the addition of an excess of water to the ripening solution. The precipitated cellulose acetate is separated from solution and washed.

After washing, the cellulose acetate is redissolved in acetic acid for the second stage of ripening, a predetermined amount of aliphatic polycarboxylic acid is added to the resulting solution and the cellulose acetate is ripened. The second ripening stage may be carried out at temperatures of from 30° C. to 120° C. and for from 2 to 80 hours. When the cellulose acetate has ripened to the desired degree, water is added to the solution in an amount sufficient to precipitate the cellulose acetate from solution, after which it is separated, washed and dried. This cellulose acetate possesses a high degree of stability and may be employed directly without any stabilizing treatment whatever.

Prior to acetylation the cellulose may, for example, be pretreated with acetic acid or formic acid, or a mixture of these acids, in order to render it more reactive. The acids may be present in a small amount, say, for example, from 1 to 50% on the weight of the cellulose, or in much larger quantities, for example, on the order of 100%, 200%, or even 300% on the weight of the cellulose. The pretreatment is preferably allowed to go on for some hours, for example, overnight. However, the presence of sulfuric acid reduces the time of pretreatment appreciably. The pretreated cellulose is then treated with acetic anhydride and sulfuric acid in appropriate amount to bring about acetylation.

The cellulosic material esterified in accordance with our process may be any suitable form of cellulose or cellulose derivative. It may be cotton, cotton linters, wood pulp, regenerated cellulose, or other cellulosic material obtainable from various other sources such as grasses, straws, hulls and the like.

In order further to illustrate our invention but without being limited thereto, the following examples are given:

Example I 170 parts by weight of cotton are acetylated with 358 parts of acetic anhydride, 2050 parts by weight of acetic acid and 25 parts of sulfuric acid. The time of acetylation is 6 hours, during which time the mixture is allowed to attain a peak temperature of 36° C. After the acetylation is completed, water in an amount sufficient only to react with any excess acetic anhydride is added to the reaction mixture. 50 parts of water on the weight of the original cellulose are added for ripening and the cellulose acetate is ripened at 35° C. for 30 hours, or until it is of an acetyl value of 56%, calculated as acetic acid. At this point an excess of water is added to the solution to precipitate the cellulose acetate. The precipitated cellulose acetate is separated and then washed free of acids.

The resulting acid-free cellulose acetate is dissolved in 1500 parts of acetic acid containing 255 parts of water for the second stage of ripening. To this solution are added 0.85 part of oxalic acid, or ½% on the weight of the original cellulose acetylated, and the cellulose acetate is ripened at a temperature of 80° C. for 22 hours, at which time it has an acetyl value of 53.1%, calculated as acetic acid. The cellulose acetate is precipitated from solution by the addition of an excess of water and is then washed and dried. The cellulose acetate obtained by this novel ripening process is of a very high degree of stability and may be employed satisfactorily with no stabilizing treatment.

Example II

Cellulose acetate is prepared in accordance with the process as given in Example I and ripened to an acetyl value of 56% as described.

After being precipitated and washed free of acids, the cellulose acetate is dissolved in 1500 parts of acetic acid containing 255 parts of water. 0.85 part of tartaric acid is added to the solution and the cellulose acetate is ripened for the second stage in the resulting solution for 32 hours at a temperature of 80° C. The cellulose acetate is precipitated from solution by the addition of an excess of water and the cellulose acetate is then washed and dried. The cellulose acetate obtained has an acetyl value of 53.1%, calculated as acetic acid, and possesses excellent stability.

It is to be understood that the foregoing detailed description is given merely by way of illustration and that many variations may be made therein without departing from the spirit of my invention.

Having described my invention, what I desire to secure by Letters Patent is:

1. Process for the production of organic esters of cellulose of improved stability, which comprises esterifying cellulose by means of an esterifying agent and ripening the organic acid ester of cellulose formed in a plurality of stages, in the final stage of which the ripening is effected in the presence of an aliphatic polycarboxylic acid.

2. Process for the production of cellulose acetate of improved stability, which comprises acetylating cellulose by means of an acetylating agent and ripening the cellulose acetate formed in a plurality of stages, in the final stage of which the ripening is effected in the presence of an aliphatic polycarboxylic acid.

3. Process for the production of cellulose acetate of improved stability, which comprises acetylating cellulose by means of an acetylating agent and ripening the cellulose acetate formed in two stages, the cellulose acetate being ripened during the second ripening stage in the presence of an aliphatic carboxylic acid.

4. Process for the production of cellulose acetate of improved stability, which comprises acetylating cellulose by means of an acetylating agent and ripening the cellulose acetate formed in two stages, the cellulose acetate being precipitated from solution after the first ripening stage and ripened during the second ripening stage in the presence of oxalic acid.

5. Process for the production of cellulose acetate of improved stability, which comprises acetylating cellulose by means of an acetylating agent and ripening the cellulose acetate formed in two stages, the cellulose acetate being precipitated from solution after the first ripening stage and ripened during the second ripening stage in the presence of tartaric acid.

6. Process for the production of cellulose acetate of improved stability, which comprises acetylating cellulose by means of an acetylating agent and ripening the cellulose acetate formed in two stages, the cellulose acetate being precipitated from solution after the first ripening stage and ripened during the second ripening stage in the presence of maleic acid.

ROBERT D. ROWLEY.